(12) United States Patent
Zhang et al.

(10) Patent No.: US 10,498,156 B2
(45) Date of Patent: Dec. 3, 2019

(54) CHARGING CONTROL METHOD, CHARGING CONTROL DEVICE AND TERMINAL

(71) Applicant: GUANGDONG OPPO MOBILE TELECOMMUNICATIONS CORP., LTD., Dongguan (CN)

(72) Inventors: Qiang Zhang, Dongguan (CN); Fanhong Kong, Dongguan (CN); Fuchun Liao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 70 days.

(21) Appl. No.: 15/725,126

(22) Filed: Oct. 4, 2017

(65) Prior Publication Data
US 2018/0205234 A1    Jul. 19, 2018

(30) Foreign Application Priority Data

Jan. 13, 2017  (CN) .......................... 2017 1 0026135

(51) Int. Cl.
*H02J 7/00*    (2006.01)
(52) U.S. Cl.
CPC ............ *H02J 7/007* (2013.01); *H02J 7/0073* (2013.01); *H02J 7/0083* (2013.01)
(58) Field of Classification Search
CPC ......... H02J 7/007; H02J 7/0083; H02J 7/0073
(Continued)

(56) References Cited

U.S. PATENT DOCUMENTS

| 8,228,040 | B2* | 7/2012 | Utsumi ............. H01M 10/4207 320/136 |
| 9,197,089 | B2* | 11/2015 | Choe ....................... H02J 7/007 |

(Continued)

FOREIGN PATENT DOCUMENTS

| CN | 101640296 A | 2/2010 |
| CN | 102148410 A | 8/2011 |

(Continued)

OTHER PUBLICATIONS

PCT/CN2017/110135 English translation of International Search Report and Written Opinion dated Jan. 26, 2018, 12 pages.
(Continued)

*Primary Examiner* — M Baye Diao
(74) *Attorney, Agent, or Firm* — Lathrop Gage LLP

(57) ABSTRACT

A charging control method, a charging control device and a terminal are provided. According to the charging control method, it is determined whether the present charging stage is the constant voltage charging stage. The predetermined charging cut-off voltage is increased to the first charging cut-off voltage if the present charging stage is the constant voltage charging stage. The charging current and the battery voltage are periodically detected at a predetermined time interval. The first charging cut-off voltage is decreased by the predetermined voltage adjustment magnitude when the charging current is greater than or equal to the predetermined threshold and the battery voltage is greater than or equal to the safety voltage. The charging is completed when the charging current is less than the predetermined threshold.

20 Claims, 8 Drawing Sheets

(58) Field of Classification Search
USPC .......................................................... 320/148
See application file for complete search history.

(56) References Cited

U.S. PATENT DOCUMENTS

| | | | | |
|---|---|---|---|---|
| 9,837,836 | B2* | 12/2017 | Li | ........................ H02J 7/007 |
| 10,084,333 | B2* | 9/2018 | Zeng | .................... G01R 31/44 |
| 10,153,651 | B2* | 12/2018 | Taylor | ................ H01M 10/288 |
| 2005/0134221 | A1 | 6/2005 | Wanibuchi et al. | |
| 2015/0010783 | A1* | 1/2015 | He | ...................... H01M 10/42 |
| | | | | 429/7 |
| 2016/0336623 | A1* | 11/2016 | Nayar | .................... H01M 4/38 |
| 2017/0271903 | A1 | 9/2017 | Tian et al. | |

FOREIGN PATENT DOCUMENTS

| | | |
|---|---|---|
| CN | 103107378 A | 5/2013 |
| CN | 104037462 A | 9/2014 |
| CN | 104467139 A | 3/2015 |
| CN | 105071449 A | 11/2015 |
| CN | 105656160 A | 6/2016 |
| CN | 106026269 A | 10/2016 |
| CN | 106233565 A | 12/2016 |
| CN | 106655396 A | 5/2017 |
| WO | 2015151376 A1 | 10/2015 |

OTHER PUBLICATIONS

European Patent Application No. 17199358.7 extended Search and Opinion dated May 25, 2018, 9 pages.
Chinese Patent Application No. 201710026135.9 English translation of Office Action dated Sep. 25, 2018, 7 pages.
Chinese Patent Application No. 201710026135.9 Office Action dated Sep. 25, 2018, 7 pages.

* cited by examiner

CHARGING CONTROL METHOD, CHARGING CONTROL DEVICE AND TERMINAL

CROSS-REFERENCE TO RELATED APPLICATIONS

This application claims priority to and benefits of Chinese Patent Application Serial No. 201710026135.9, filed with the State Intellectual Property Office of P. R. China on Jan. 13, 2017, the entire contents of which are incorporated herein by reference.

TECHNICAL FIELD

The present disclosure relates to the terminal technology field, and more particularly to, a charging control method, a charging control device and a terminal.

BACKGROUND

At present, mobile terminals such as smart phones can be powered by batteries. When the battery runs out, it needs to charge the battery to enable the battery to resume power supply.

The charging process of the battery generally includes a pre-charging stage (also known as a trickle charging stage), a constant current charging stage, and a constant voltage charging stage.

With the popularization of the mobile terminals, there is an urgent need to shorten the charging time.

SUMMARY

The present disclosure aims to solve at least one of the existing problems to some extent.

In a first aspect of embodiments of the present disclosure, a charging control method is provided. The charging control method includes: determining whether a present charging stage is a constant voltage charging stage; increasing a predetermined charging cut-off voltage to a first charging cut-off voltage if the present charging stage is the constant voltage charging stage; periodically detecting a charging current and a battery voltage at a predetermined time interval; decreasing the first charging cut-off voltage by a predetermined voltage adjustment magnitude when the charging current is greater than or equal to a predetermined threshold and the battery voltage is greater than or equal to a safety voltage; and stopping charging when the charging current is less than the predetermined threshold.

In a second aspect of embodiments of the present disclosure, a charging control device is provided. The charging control device includes a non-transitory computer-readable medium including computer-executable instructions stored thereon and an instruction execution system which is configured by the instructions to implement at least one of a determining module, a first adjusting module, a detecting module, a second adjusting module and a stopping module. The determining module is configured to determine whether a present charging stage is a constant voltage charging stage. The first adjusting module is configured to increase a predetermined charging cut-off voltage to a first charging cut-off voltage if the present charging stage is the constant voltage charging stage. The detecting module is configured to periodically detect a charging current and a battery voltage at a predetermined time interval. The second adjusting module is configured to decrease the first charging cut-off voltage by a predetermined voltage adjustment magnitude when the charging current is greater than or equal to a predetermined threshold and the battery voltage is greater than or equal to a safety voltage. The completing module is configured to stopping charging when the charging current is less than the predetermined threshold.

In a third aspect of embodiments of the present disclosure, a terminal is provided. The terminal includes a battery, a memory and a processor. The battery is configured to power respective components in the terminal. The memory is stored with executable program codes. The processor is coupled to the memory and is configured to perform a charging control method described above by executing the executable program codes stored in the memory.

According to the charging control method of embodiments of the present disclosure, it is determined whether the present charging stage is the constant voltage charging stage. The predetermined charging cut-off voltage is increased to the first charging cut-off voltage if the present charging stage is the constant voltage charging stage. The charging current and the battery voltage are periodically detected at a predetermined time interval. The first charging cut-off voltage is decreased by the predetermined voltage adjustment magnitude when the charging current is greater than or equal to the predetermined threshold and the battery voltage is greater than or equal to the safety voltage. The charging is stopped when the charging current is less than the predetermined threshold. In other words, in the constant voltage charging stage, the charging cut-off voltage is first increased, and the charging current is increased with the increasing of the charging cut-off voltage. When the battery voltage is greater than or equal to the safety voltage, the charging cut-off voltage is decreased, and when the charging current is less than the predetermined threshold, the charging process is completed. In this way, the battery may be fully charged more quickly, and the charging time may be shortened.

BRIEF DESCRIPTION OF THE DRAWINGS

These and other aspects and advantages of the disclosure will become apparent and more readily appreciated from the following descriptions taken in conjunction with the drawings as described below. It will be appreciated that the drawings in the following description are merely exemplary of embodiments of the present disclosure, and other drawings may be obtained from these drawings by one skilled in the art without inventive work.

DETAILED DESCRIPTION

Figure 1:
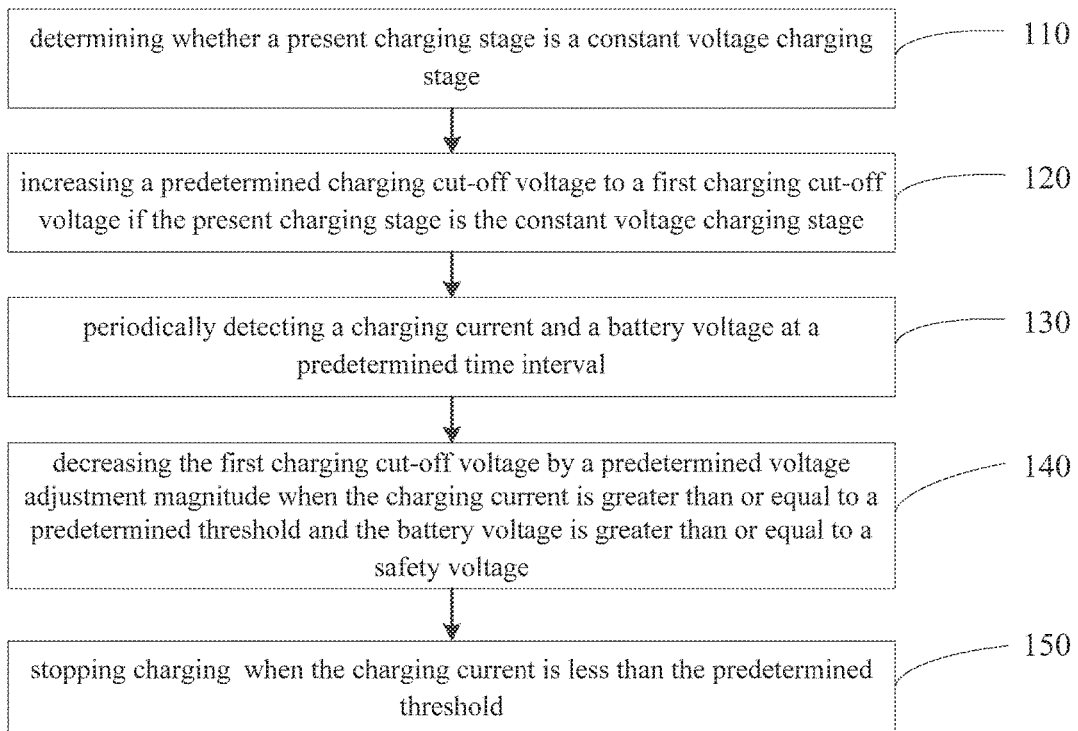
FIG. 1 is a flow chart of a charging control method according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In addition, terms such as "first", "second" and "third" (if needed) are used herein for purposes of description and are not intended to indicate or imply relative importance or significance. It should be understood that objects described by "first", "second" and "third" (if needed) may be replaced by each other in some cases. It should be further understood that, when used in the specification, terms "comprising" and/or "including" specify the presence of stated features, operations, elements and/or components, but do not exclude the presence or addition of one or more other features, operations, elements, components and/or groups thereof.

In practice, a battery charging process includes a pre-charging stage, a constant current charging stage, and a constant voltage charging stage. A charging current in the pre-charging stage is very small, and thus only less power is increased for the battery in this stage. In the constant current charging stage, a high constant current is used for charging, and thus more power is increased for the battery in this stage. In the constant voltage charging stage, a constant voltage is used for charging, and the charging current is gradually reduced until the battery is fully charged. In the constant voltage charging stage, more power is increased for the battery as well. During the entire charging process, the battery voltage is gradually increased.

In the constant voltage charging process, since it is required to ensure that the actual voltage of the battery does not exceed the maximum voltage which the battery can withstand, a charging cut-off voltage (constant voltage) is usually set at a low level, resulting in a relatively low charging current in the constant voltage charging stage, thus extending the charging time.

Embodiments of the present disclosure provide a charging control method, a charging control device and a terminal, which will be respectively described in detail below.

In an embodiment of the present disclosure, a charging control method is provided, and such method may be applied in a terminal. The terminal may be a smart phone, a tablet personal computer and the like.

As illustrated in FIG. 1, the charging control method may include followings.

At block 110, it is determined whether a present charging stage is a constant voltage charging stage.

When the battery is in the charging state, the terminal determines whether the present charging stage is the constant voltage charging stage.

Figure 2:
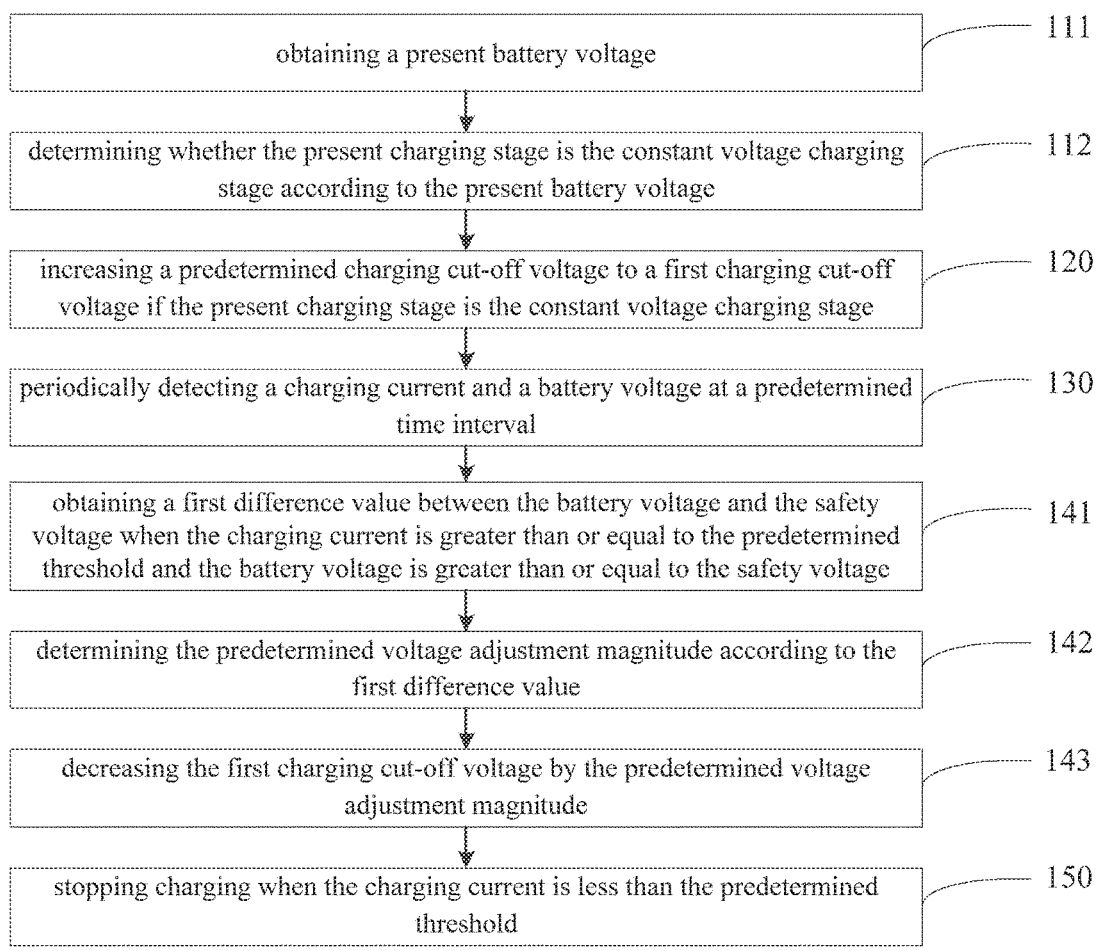
FIG. 2 is a flow chart of a charging control method according to another embodiment of the present disclosure.

With reference to FIG. 2, in some embodiments, it may be determined whether the present charging stage is the constant voltage charging stage as follows.

At block 111, a present battery voltage is obtained.

At block 112, it is determined whether the present charging stage is the constant voltage charging stage according to the present battery voltage.

In practice, the terminal may obtain the present battery voltage. Since characteristics of the battery voltage are different in different charging stages, it is possible to determine whether the present charging stage is the constant voltage charging stage according to the battery voltage.

In addition, the charging current in different charging stages is different. Thus, in other embodiments, it is also possible to determine whether the present charging stage is the constant voltage charging stage according to the charging current.

Figure 3:
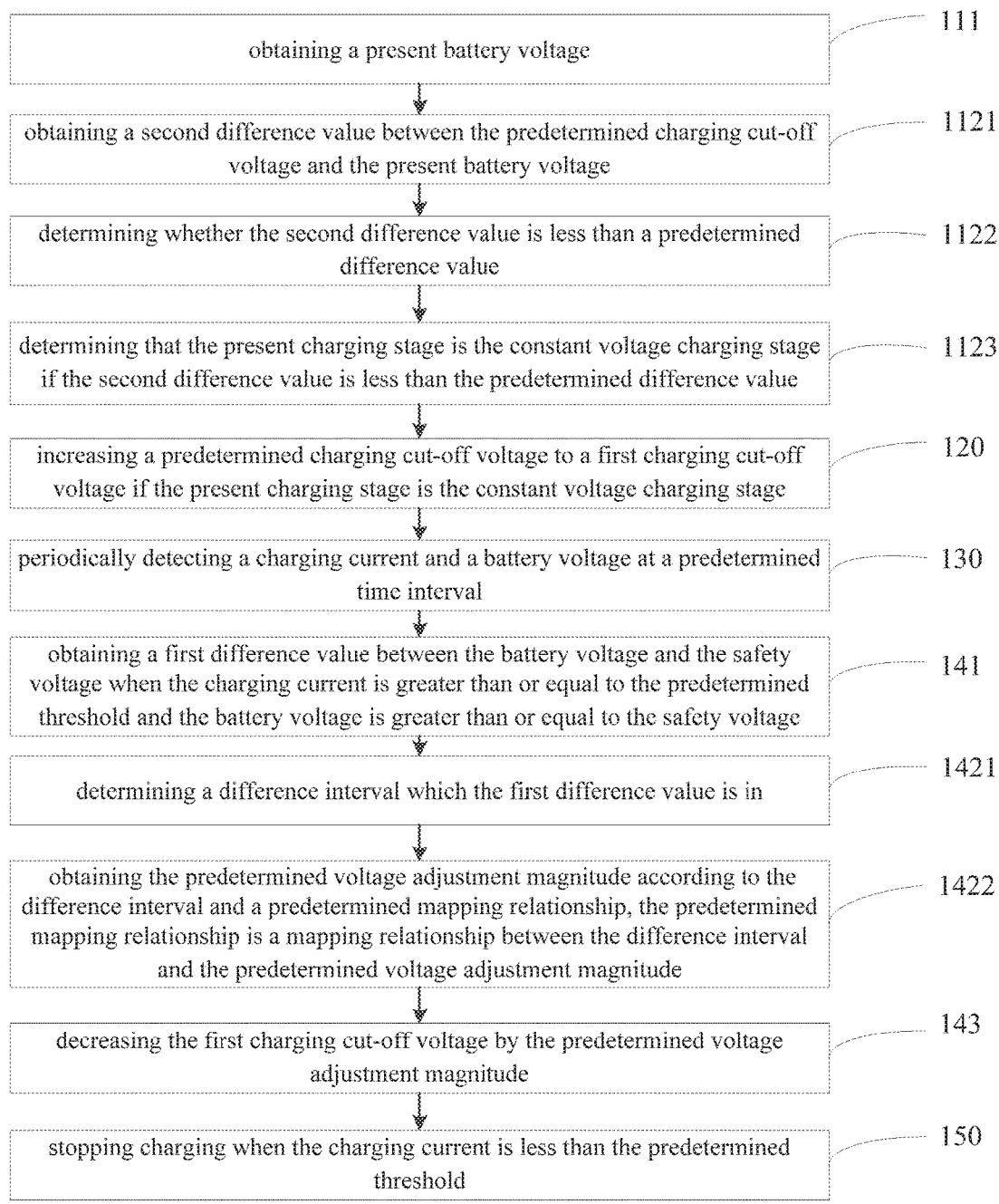
FIG. 3 is a flow chart of a charging control method according to yet another embodiment of the present disclosure.

With reference to FIG. 3, in some embodiments, it may be determined whether the present charging stage is the constant voltage charging stage according to the present battery voltage as follows.

At block 1121, a second difference value between the predetermined charging cut-off voltage and the present battery voltage is obtained.

At block 1122, it is determined whether the second difference value is less than a predetermined difference value.

At block 1123, it is determined that the present charging stage is the constant voltage charging stage if the second difference value is less than the predetermined difference value.

In an embodiment of the present disclosure, the predetermined charging cut-off voltage may be a voltage value pre-stored in the terminal. The charging cut-off voltage is the basis for the charging process to switch from the constant current charging stage to the constant voltage charging stage. When the battery is in the constant current charging stage, the battery voltage is gradually increased. When the battery voltage is close to the charging cut-off voltage, the charging stage, i.e., the constant current charging stage, is switched to the constant voltage charging stage.

In practice, the terminal acquires the predetermined charge cut-off voltage stored in the terminal after obtaining the present battery voltage. Then, the second difference value between the predetermined charging cut-off voltage and the present battery voltage is calculated. For example, if the obtained battery voltage is 4.3 V and the predetermined charging cut-off voltage is 4.35 V, the second difference value may be calculated as 0.05 V, that is, 50 mV.

The predetermined difference value may be a voltage value pre-stored in the terminal. For example, the predetermined difference value may be 100 mV. After the second difference value is calculated by the terminal, the second difference value is compared with the predetermined difference value to determine whether the second difference value is less than the predetermined difference value.

When the second difference value is less than the predetermined difference value, it may be determined that the present charging stage is the constant voltage charging stage. For example, if the second difference is 50 mV and the predetermined difference value is 100 mV, the second difference value is less than the predetermined difference value. At this time, the present battery voltage has been close to the predetermined charging cut-off voltage, and thus it may be determined that the present charging stage is the constant voltage charging stage.

At block 120, the predetermined charging cut-off voltage is increased to a first charging cut-off voltage when the present charging stage is the constant voltage charging stage.

In practice, when it is determined in block 110 that the present charging stage is the constant voltage charging stage, the charging cut-off voltage is increased by the terminal to a certain extent. The charging cut-off voltage is increased from the predetermined charging cut-off voltage to the first charging cut-off voltage. For example, when the predetermined charging cut-off voltage is 4.35 V, the charging cut-off voltage may be increased from 4.35 V to 4.45 V, and the first charging cut-off voltage is 4.45 V.

When it is determined in block 110 that the present charging stage is not the constant voltage charging stage, it indicates that the charging process at this time has not reached the constant voltage charging stage, and the charging is performed in accordance with the normal charging process.

At block 130, a charging current and a battery voltage are periodically detected at a predetermined time interval.

In an embodiment of the present disclosure, the predetermined time interval may be a time period predetermined and stored in the terminal, and the terminal may periodically detect the charging current and the battery voltage at the predetermined time interval. For example, if the predetermined time interval is 5 seconds, the charging current and the battery voltage are detected by the terminal every 5 seconds.

At block 140, the first charging cut-off voltage is decreased by a predetermined voltage adjustment magnitude when the charging current is greater than or equal to a predetermined threshold and the battery voltage is greater than or equal to a safety voltage.

In an embodiment of the present disclosure, the predetermined threshold may be a current value predetermined and stored in the terminal. In practice, the predetermined threshold is related to the battery capacity. For example, the predetermined threshold may be 0.05 times the value of the battery capacity. For example, if the battery capacity is 3000 mAh, the predetermined threshold is 150 mA. If the battery capacity is 4000 mAh, the predetermined threshold is 200 mA.

The safe voltage may be a voltage value predetermined and stored in the terminal. The safety voltage is the maximum value the battery voltage can reach under normal conditions. For example, the safe voltage may be 4.4 V.

It should be noted that, the battery voltage detected by the terminal during the charging process is a voltage between the positive contact and negative contact of the battery. During the charging process, the voltage between the positive and negative contacts of the battery is greater than the actual voltage of the battery. In this case, the detected battery voltage may be greater than the safety voltage in a short time without affecting the safety of the battery.

The predetermined voltage adjustment magnitude may be a voltage value or a numeric value (e.g., a percentage) predetermined and stored in the terminal. For example, the predetermined voltage adjustment magnitude may be 20 mV or 1%.

When the charging current detected by the terminal in block 130 is greater than or equal to the predetermined threshold and the battery voltage detected is greater than or equal to the safety voltage, the terminal decreases the first charging cut-off voltage by the predetermined voltage adjustment magnitude. For example, if the first charging cut-off voltage is 4.45 V and the predetermined voltage adjustment magnitude is 20 mV, the adjusted first charging cut-off voltage is 4.43 V.

After the charging cut-off voltage is decreased, the battery is still in the charging state and the actual voltage of the battery is still gradually increasing. When the predetermined time interval has elapsed, the terminal detects the charging current and the battery voltage again. If it is again detected that the battery voltage is greater than or equal to the safety voltage, the charging cut-off voltage is decreased by the terminal again.

In some embodiments of the present disclosure, when the charging current is greater than or equal to the predetermined threshold and the battery voltage is greater than or equal to the safety voltage, the first charging cut-off voltage may be decreased by the predetermined voltage adjustment magnitude as follows.

At block 141, a first difference value between the battery voltage and the safety voltage is obtained when the charging current is greater than or equal to the predetermined threshold and the battery voltage is greater than or equal to the safety voltage.

At block 142, the predetermined voltage adjustment magnitude is determined according to the first difference value.

At block 143, the first charging cut-off voltage is decreased by the predetermined voltage adjustment magnitude.

In a practice, the terminal calculates the first difference between the battery voltage and the safety voltage when the terminal detects that the charging current is greater than or equal to the predetermined threshold and the battery voltage is greater than or equal to the safety voltage. For example, if the detected battery voltage is 4.45 V and the safe voltage is 4.4 V, the first difference value can be calculated as 0.05 V, that is, 50 mV.

Then, the terminal acquires the predetermined voltage adjustment magnitude according to the first difference value. In an embodiment of the present disclosure, a correspondence relationship between the first difference value and the predetermined voltage adjustment magnitude may be stored in advance in the terminal. When the terminal acquires the first difference value, the predetermined voltage adjustment magnitude may be obtained according to the first difference value and the correspondence relationship.

Then, the terminal decreases the first charging cut-off voltage according to the predetermined voltage adjustment magnitude acquired above.

After the first charging cut-off voltage is adjusted by the terminal, the charging current and the battery voltage are detected by the terminal again after the predetermined time interval.

In some embodiments of the present disclosure, the predetermined voltage adjustment magnitude may be determined according to the first difference value as follows.

At block 1421, a difference interval where the first difference value is located is determined.

At block 1422, the predetermined voltage adjustment magnitude is obtained according to the difference interval and a predetermined mapping relationship, in which the predetermined mapping relationship is a mapping relationship between the difference interval and the predetermined voltage adjustment magnitude.

In an embodiment of the present disclosure, a plurality of difference intervals may be predetermined for the first difference value. For example, a plurality of difference intervals such as (0,20], (20,40], (40,60], (60,80], and (80, 100] in a voltage unit of mV are predetermined. After obtaining the first difference value, the terminal determines which difference interval the first difference value is in.

In addition, the mapping relationship between the difference interval and the predetermined voltage adjustment magnitude may be predetermined and stored in the terminal. For example, the predetermined voltage adjustment magnitudes corresponding to the difference intervals (0,20], (20, 40], (40,60], (60,80] and (80,100] may be 10 mV, 20 mV, 30 mV, 40 mV or 50 mV respectively. After the terminal determines the difference interval which the first difference value is in, the predetermined voltage adjustment magnitude is obtained according to the difference interval and the mapping relationship.

For example, the first difference value obtained by the terminal is 50 mV, and then the difference interval where the first difference value is located is (40,60], and thus the predetermined voltage adjustment magnitude is 30 mV.

At block 150, charging is stopped when the charging current is less than the predetermined threshold.

In practice, when the charging current detected in block 130 is less than the predetermined threshold, it indicates that the battery has been fully charged and the charging is completed.

Figure 4:
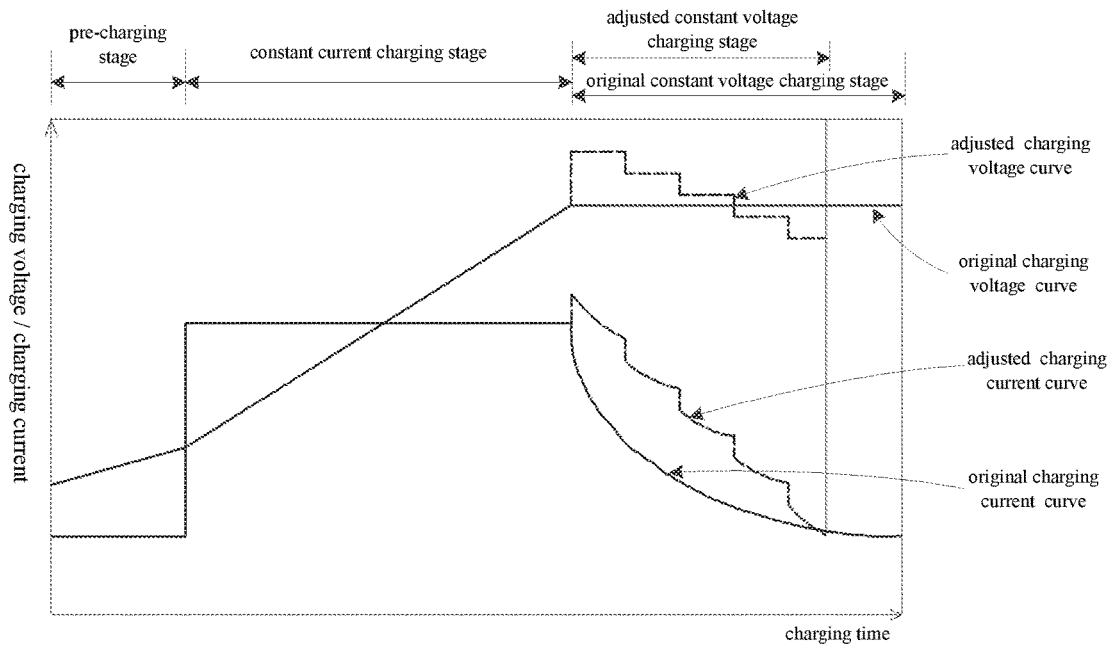
FIG. 4 is a schematic diagram illustrating a relationship between charging voltage/charging current and charging time according to an embodiment of the present disclosure.

Referring to FIG. 4, which a schematic diagram of a relationship between charging voltage/charging current and charging time in the charging process, the charging process includes the pre-charging stage, the constant current charging stage and the constant voltage charging stage. The charging voltage in the constant voltage charging stage is the charging cut-off voltage.

In a conventional charging process, the constant voltage is used for charging in the constant voltage charging stage, and the charging needs a long time. However, according to the solutions of the present disclosure, the charging cut-off voltage in the constant voltage charging stage is increased first, and then decreased. The charging current in the constant voltage charging stage is first increased to exceed the charging current in the constant current charging stage, followed by being gradually decreased to the charging cut-off current, i.e., the above-mentioned predetermined threshold, and then the charging is completed. Since the charging current in the constant voltage charging stage is increased, the battery may be fully charged more quickly, and the charging time may be shortened.

Figure 5:
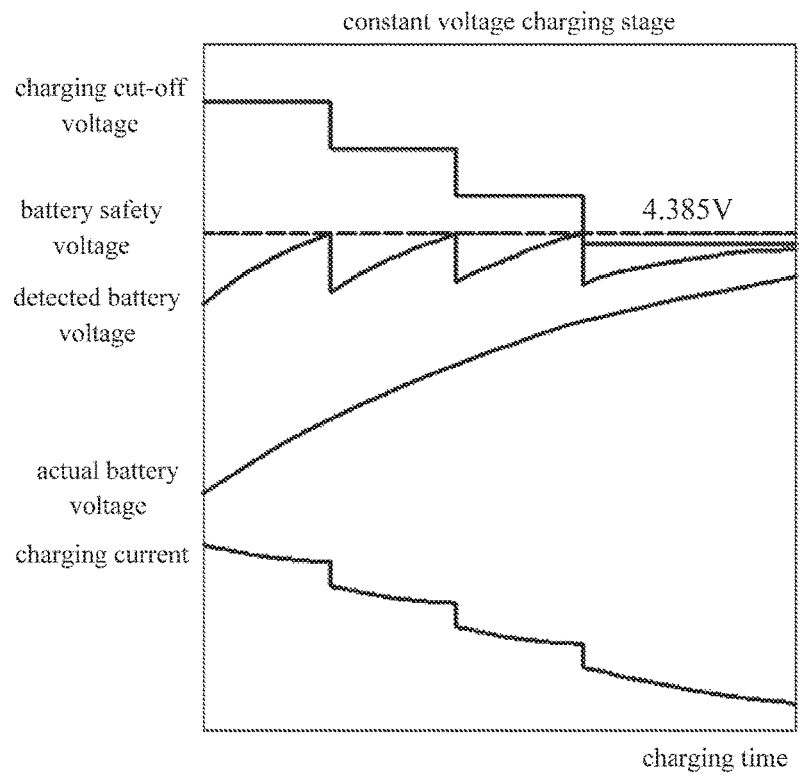
FIG. 5 is a schematic diagram illustrating a relationship between a charging cut-off voltage, a battery safety voltage, a detected battery voltage, an actual battery voltage and a charging current and charging time in the constant voltage charging stage according to an embodiment of the present disclosure.

FIG. 5 is a schematic diagram of a relationship between a charging cut-off voltage, a battery safety voltage, a detected battery voltage, an actual battery voltage and a charging current and charging time in the constant voltage charging stage according to an embodiment of the present disclosure. With reference to FIG. 5, in the constant voltage charging stage, the charging cut-off voltage is gradually decreased in a step-by-step manner. The detected battery voltage is gradually increased when the charging cut-off voltage remains the same, and is decreased when the charging cut-off voltage is decreased. The actual battery voltage is gradually increased. The charging current is gradually decreased. In an embodiment of the present disclosure, the charging cut-off voltage is controlled by the terminal to be decreased when the detected battery voltage reaches the battery safety voltage. When the charging current is decreased to the charging cut-off current, the charging is completed.

It should be noted that the terminal controls the charging cut-off voltage to be decreased only when the battery voltage is detected to be greater than or equal to the battery safety voltage. The time elapsed between each two adjustments of the charging cut-off voltage is not necessarily the same, that is, a length of a time period before a first adjustment of the charging cut-off voltage, which is kept constant, is not necessarily the same as a length of a time period before a second adjustment of the charging cut-off voltage, which is also constant.

In the case of specific implementations, the present disclosure is not limited by the order of execution of various blocks described, and some blocks may also be performed in other orders or concurrently without conflicts.

As described above, according to the charging control method of embodiments of the present disclosure, it is determined whether the present charging stage is the constant voltage charging stage. The predetermined charging cut-off voltage is increased to the first charging cut-off voltage if the current charging stage is the constant voltage charging stage. The charging current and the battery voltage are periodically detected at a predetermined time interval. The first charging cut-off voltage is decreased by the predetermined voltage adjustment magnitude when the charging current is greater than or equal to the predetermined threshold and the battery voltage is greater than or equal to the safety voltage. The charging is stopped when the charging current is less than the predetermined threshold. In other words, in the constant voltage charging stage, the charging cut-off voltage is increased first, and the charging current is increased with the increasing of the charging cut-off voltage. When the battery voltage is greater than or equal to the safety voltage, the charging cut-off voltage is decreased, and when the charging current is less than the predetermined threshold, the charging process is completed. Therefore, the battery may be fully charged more quickly, and the charging time may be shortened.

In embodiments of the present disclosure, a charging control device is also provided. The device may be integrated in a terminal, and the terminal may be a smart phone, a tablet personal computer and the like.

Figure 6:
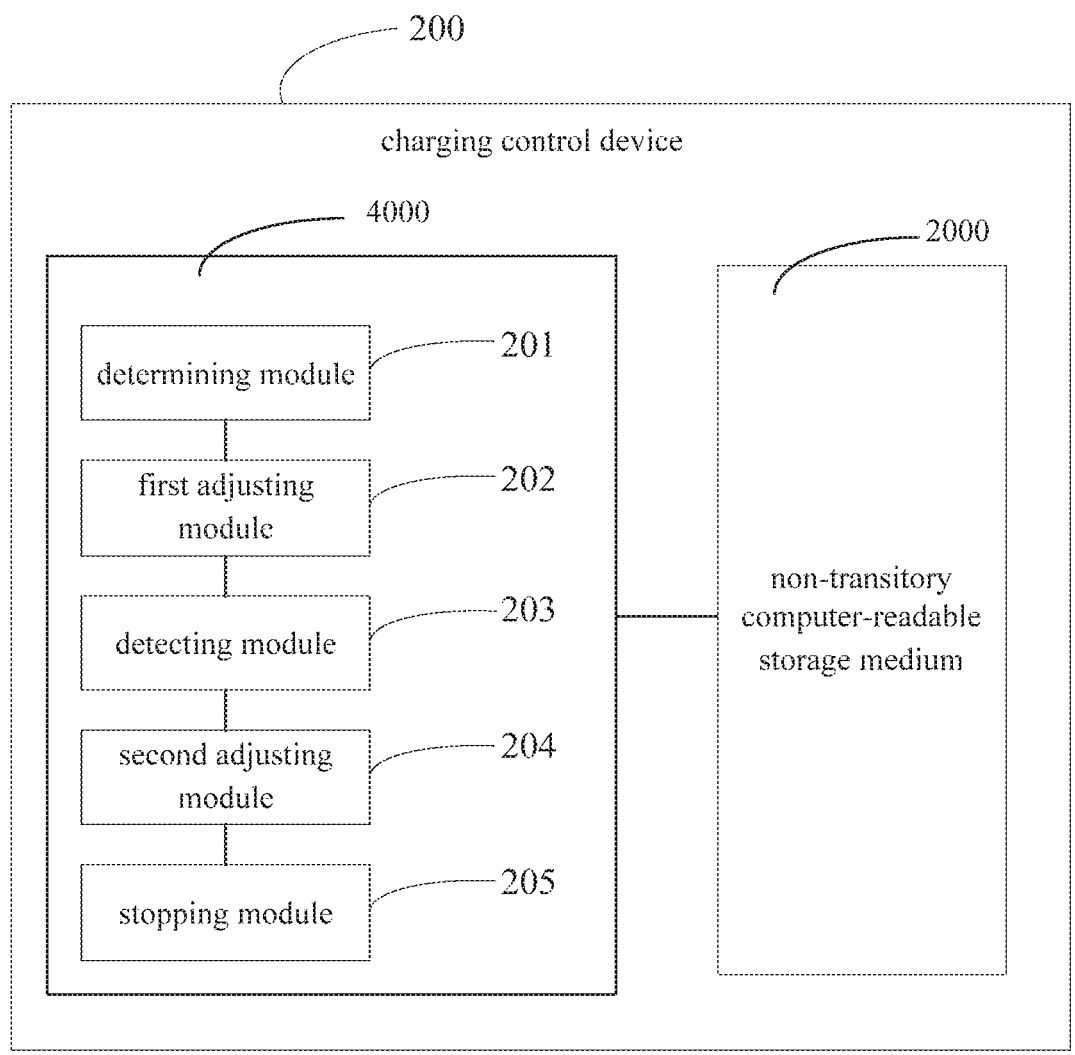
FIG. 6 is a block diagram of a charging control device according to an embodiment of the present disclosure.

As illustrated in FIG. 6, the charging control device 200 may include a non-transitory computer-readable medium 2000 including computer-executable instructions stored thereon and an instruction execution system 4000 which is configured by the instructions to implement at least one of a determining module 201, a first adjusting module 202, a detecting module 203, a second adjusting module 204 and a stopping module 205.

The determining module 201 is configured to determine whether a present charging stage is a constant voltage charging stage.

In practice, a battery charging process includes a pre-charging stage, a constant current charging stage, and a constant voltage charging stage. A charging current in the pre-charging stage is very small, and thus only less power is increased for the battery in this stage. In the constant current charging stage, a high constant current is used for charging, and thus more power is increased for the battery in this stage. In the constant voltage charging stage, a constant voltage is used for charging, and the charging current is gradually reduced until the battery is fully charged. In the constant voltage charging stage, more power is increased for the battery as well. During the entire charging process, the battery voltage is gradually increased.

When the battery is in the charging state, the determining module 201 determines whether the present charging stage is the constant voltage charging stage.

Figure 7:
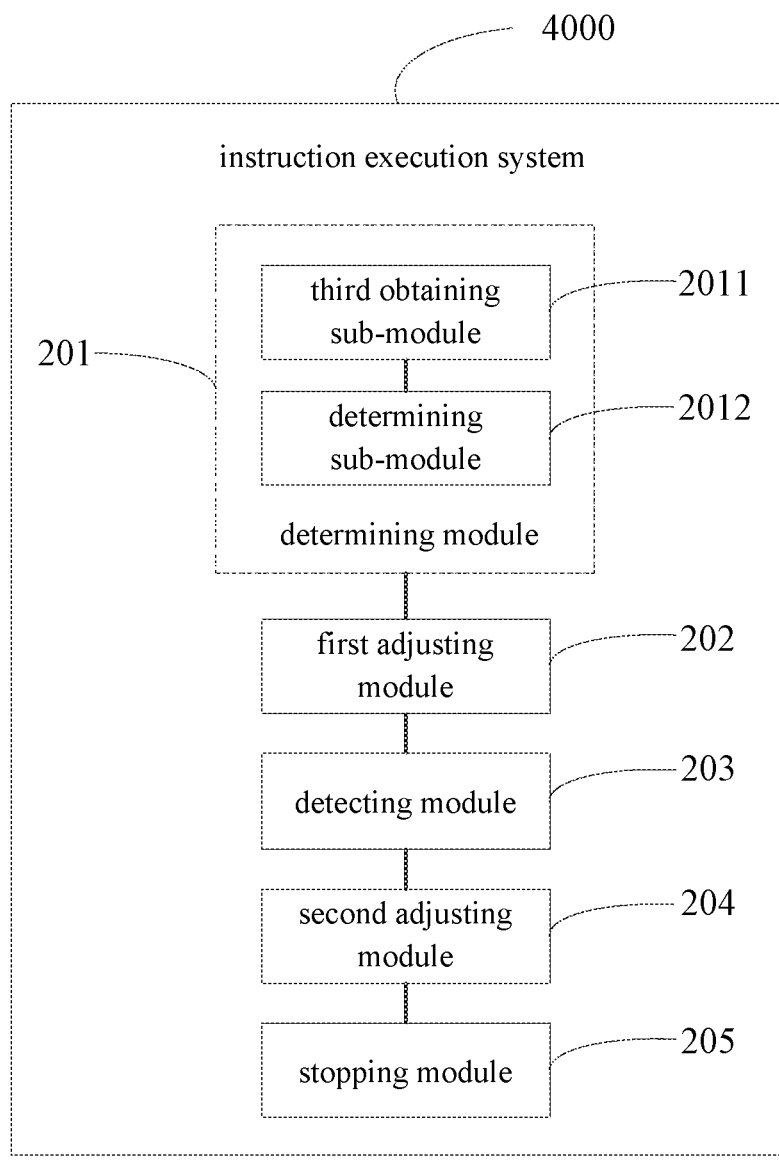
FIG. 7 is a block diagram of a charging control device according to another embodiment of the present disclosure.

With reference to FIG. 7, in some embodiments, the determining module 201 may include a third obtaining sub-module 2011 and a determining sub-module 2012.

The third obtaining sub-module 2011 is configured to obtain a present battery voltage.

The determining sub-module 2012 is configured to determine whether the present charging stage is the constant voltage charging stage according to the present battery voltage.

In practice, the third obtaining sub-module 2011 may obtain the present battery voltage. Since characteristics of the battery voltage are different in different charging stages, it is possible for the determining sub-module 2012 to determine whether the present charging stage is the constant voltage charging stage according to the battery voltage.

In addition, the charging current in different charging stages is different. Thus, in other embodiments, it is also possible to determine whether the present charging stage is the constant voltage charging stage according to the charging current.

In some embodiments of the present disclosure, the determining sub-module 2012 is configured to obtain a second difference value between the predetermined charging cut-off voltage and the present battery voltage, to determine whether the second difference value is less than a predetermined difference value, and to determine that the present charging stage is the constant voltage charging stage if the second difference value is less than the predetermined difference value.

In an embodiment of the present disclosure, the predetermined charging cut-off voltage may be a voltage value pre-stored in the terminal. The charging cut-off voltage is the basis for the charging process to switch from the constant current charging stage to the constant voltage charging stage. When the battery is in the constant current charging stage, the battery voltage is gradually increased. When the battery voltage is close to the charging cut-off voltage, the charging stage, i.e., the constant current charging stage, is switched to the constant voltage charging stage.

In practice, after the third obtaining sub-module 2011 obtains the present battery voltage, the determining sub-module 2012 obtains the predetermined charge cut-off voltage stored in the terminal, and calculates the second difference value between the predetermined charging cut-off voltage and the present battery voltage. For example, if the obtained battery voltage is 4.3 V and the predetermined charging cut-off voltage is 4.35 V, the second difference value may be calculated as 0.05 V, that is, 50 mV.

The predetermined difference value may be a voltage value pre-stored in the terminal. For example, the predetermined difference value may be 100 mV. After calculating the second difference value, the determining sub-module 2012 compares the second difference value with the predetermined difference value to determine whether the second difference value is less than the predetermined difference value.

When the second difference value is less than the predetermined difference value, the determining sub-module 2012 may determine that the present charging stage is the constant voltage charging stage. For example, if the second difference is 50 mV and the predetermined difference value is 100 mV, the second difference value is less than the predetermined difference value. At this time, the present battery voltage has been close to the predetermined charging cut-off voltage, and thus it may be determined that the present charging stage is the constant voltage charging stage.

In embodiments of the present disclosure, the first adjusting module 202 is configured to increase the predetermined charging cut-off voltage to a first charging cut-off voltage if it is determined by the determining module 201 that the present charging stage is the constant voltage charging stage.

In the practice, when it is determined by the determining module 201 that the present charging stage is the constant voltage charging stage, the charging cut-off voltage is increased by the first adjusting module 202 to a certain extent. The charging cut-off voltage is increased from the predetermined charging cut-off voltage to the first charging cut-off voltage. For example, when the predetermined charging cut-off voltage is 4.35 V, the charging cut-off voltage may be increased from 4.35 V to 4.45 V, and the first charging cut-off voltage is 4.45 V.

When it is determined by the determining module 201 that the present charging stage is not the constant voltage charging stage, it indicates that the charging process at this time has not reached the constant voltage charging stage, and the charging is performed in accordance with the normal charging process.

In embodiments of the present disclosure, the detecting module 203 is configured to periodically detect a charging current and a battery voltage at a predetermined time interval.

In an embodiment of the present disclosure, the predetermined time interval may be a time period predetermined and stored in the terminal, and the detecting module 203 may periodically detect the charging current and the battery voltage at the predetermined time interval. For example, if the predetermined time interval is 5 seconds, the charging current and the battery voltage are detected by the detecting module 203 every 5 seconds.

In embodiments of the present disclosure, the second adjusting module 204 is configured to decrease the first charging cut-off voltage by a predetermined voltage adjustment magnitude when the charging current is greater than or equal to a predetermined threshold and the battery voltage is greater than or equal to a safety voltage.

In an embodiment of the present disclosure, the predetermined threshold may be a current value predetermined and stored in the terminal. In practice, the predetermined threshold is related to the battery capacity. For example, the predetermined threshold may be 0.05 times the value of the battery capacity. For example, if the battery capacity is 3000 mAh, the predetermined threshold is 150 mA. If the battery capacity is 4000 mAh, the predetermined threshold is 200 mA.

The safety voltage may be a voltage value predetermined and stored in the terminal. The safety voltage is the maximum value the battery voltage can reach under normal conditions. For example, the safety voltage may be 4.4 V.

It should be noted that, the battery voltage detected by the detecting module 203 during the charging process is a voltage between the positive contact and negative contact of the battery. During the charging process, the voltage between the positive and negative contacts of the battery is greater than the actual voltage of the battery. In this case, the detected battery voltage may be greater than the safety voltage in a short time without affecting the safety of the battery.

The predetermined voltage adjustment magnitude may be a voltage value or a numeric value (e.g., a percentage) predetermined and stored in the terminal. For example, the predetermined voltage adjustment magnitude may be 20 mV or 1%.

When the charging current detected by the detecting module 203 is greater than or equal to the predetermined threshold and the battery voltage detected is greater than or equal to the safety voltage, the second adjusting module 204 decreases the first charging cut-off voltage by the predetermined voltage adjustment magnitude. For example, if the first charging cut-off voltage is 4.45 V and the predetermined voltage adjustment magnitude is 20 mV, the adjusted first charging cut-off voltage is 4.43 V.

After the charging cut-off voltage is decreased, the battery is still in the charging state and the actual voltage of the battery is still gradually increased. When the predetermined time interval has elapsed, the charging current and the battery voltage are detected by the detecting module 203 again. If it is again detected that the battery voltage is greater than or equal to the safety voltage, the charging cut-off voltage is decreased by the second adjusting module 204 again.

Figure 8:
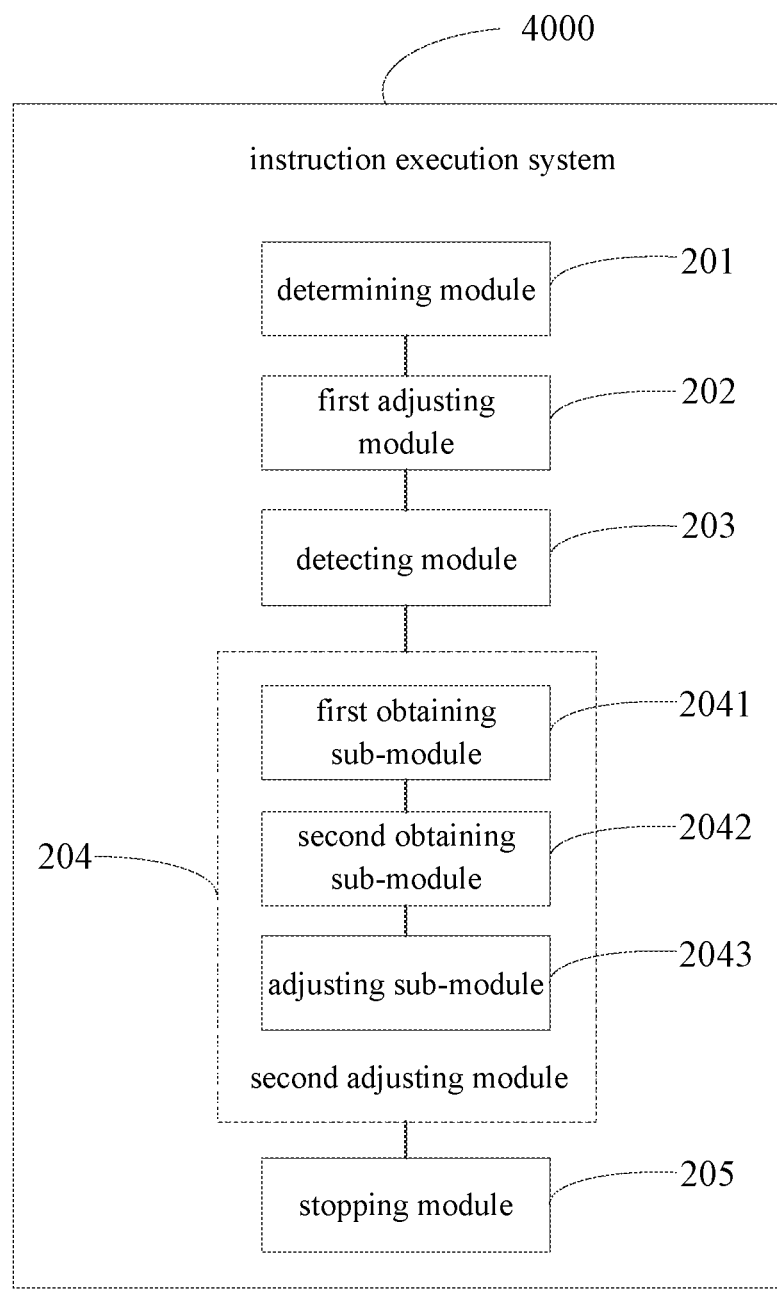
FIG. 8 is a block diagram of a charging control device according to yet another embodiment of the present disclosure.

In embodiments of the present disclosure, as illustrated in FIG. 8, the second adjusting module 204 may include a first obtaining sub-module 2041, a second obtaining sub-module 2042 and an adjusting sub-module 2043.

The first obtaining sub-module 2041 is configured to obtain a first difference value between the battery voltage and the safety voltage when the charging current is greater than or equal to the predetermined threshold and the battery voltage is greater than or equal to the safety voltage.

The second obtaining sub-module 2042 is configured to obtain the predetermined voltage adjustment magnitude according to the first difference value.

The adjusting sub-module 2043 is configured to decrease the first charging cut-off voltage by the predetermined voltage adjustment magnitude.

In a practice, the first difference value between the battery voltage and the safety voltage is calculated by the first obtaining sub-module 2041 when the detecting module 203 detects that the charging current is greater than or equal to the predetermined threshold and the battery voltage is greater than or equal to the safety voltage. For example, if the detected battery voltage is 4.45 V and the safety voltage is 4.4 V, the first difference value can be calculated as 0.05 V, that is, 50 mV.

Then, the predetermined voltage adjustment magnitude is obtained by the second obtaining sub-module 2042 according to the first difference value. In an embodiment of the present disclosure, a correspondence relationship between the first difference value and the predetermined voltage adjustment magnitude may be stored in advance in the terminal. When the first difference value is obtained by the first obtaining sub-module 2041, the predetermined voltage adjustment magnitude may be obtained by the second obtaining sub-module 2042 according to the first difference value and the correspondence relationship.

Then, the adjusting sub-module 2043 decreases the first charging cut-off voltage according to the predetermined voltage adjustment magnitude obtained as above.

After the first charging cut-off voltage is adjusted by the adjusting sub-module 2043, the charging current and the battery voltage are detected by the detecting module 203 again after the predetermined time interval.

In embodiments of the present disclosure, the second obtaining sub-module 2042 is configured to determine a difference interval where the first difference value is located, and to obtain the predetermined voltage adjustment magnitude according to the difference interval and a predetermined mapping relationship, the predetermined mapping relationship being a mapping relationship between the difference interval and the predetermined voltage adjustment magnitude.

In an embodiment of the present disclosure, a plurality of difference intervals may be predetermined for the first difference value. For example, a plurality of difference intervals such as (0,20], (20,40], (40,60], (60,80], and (80, 100] in a voltage unit of mV are predetermined. After the first difference value is obtained by the first obtaining sub-module 2041, it is determined by the second obtaining sub-module 2042 which difference interval the first difference value is in.

In addition, the mapping relationship between the difference interval and the predetermined voltage adjustment magnitude may be predetermined and stored in the terminal. For example, the predetermined voltage adjustment magnitudes corresponding to the difference intervals (0,20], (20, 40], (40,60], (60,80] and (80,100] may be 10 mV, 20 mV, 30 mV, 40 mV or 50 mV respectively. After the second obtaining sub-module 2042 determines the difference interval which the first difference value is in, the predetermined voltage adjustment magnitude is obtained according to the difference interval and mapping relationship.

For example, the first difference value obtained by the first obtaining sub-module 2041 is 50 mV, and then the difference interval which the first difference value is in is (40,60], and thus the predetermined voltage adjustment magnitude obtained by the second obtaining sub-module 2042 is 30 mV.

In embodiments of the present disclosure, the stopping module 205 is configured to stop charging when the charging current is less than the predetermined threshold.

In practice, when the charging current detected by the detecting module 203 is less than the predetermined threshold, it indicates that the battery has been fully charged and the stopping module 205 may stop the charging.

In an embodiment of the present disclosure, the above modules can be implemented as separate entities, can also be implemented in any combination, as a same entity or as a number of entities.

As described above, according to the charging control device 200 of embodiments of the present disclosure, it is determined by the determining module 201 whether the present charging stage is the constant voltage charging stage. The first adjusting module 202 increases the predetermined charging cut-off voltage to the first charging cut-off voltage if it is determined by the determining module 201 that the present charging stage is the constant voltage charging stage. The detecting module 203 periodically detects the charging current and the battery voltage at the predetermined time interval. The second adjusting module 204 decreases the first charging cut-off voltage by the predetermined voltage adjustment magnitude when it is detected by the detecting module 203 that the charging current is greater than or equal to a predetermined threshold and the battery voltage is greater than or equal to the safety voltage, and the stopping module 205 stops the charging when it is detected by the detecting module 203 that the charging current is less than the predetermined threshold. In other words, in the constant voltage charging stage, the charging cut-off voltage is increased first, and the charging current is increased with the increasing of the charging cut-off voltage. When the battery voltage is greater than or equal to the safety voltage, the charging cut-off voltage is decreased. The charging process is not completed until the charging current is less than the predetermined threshold. Therefore, the battery may be fully charged more quickly, and the charging time may be shortened.

In embodiments of the present disclosure, a terminal is also provided. The terminal may be a smart phone, a tablet personal computer or the like.

Figure 9:
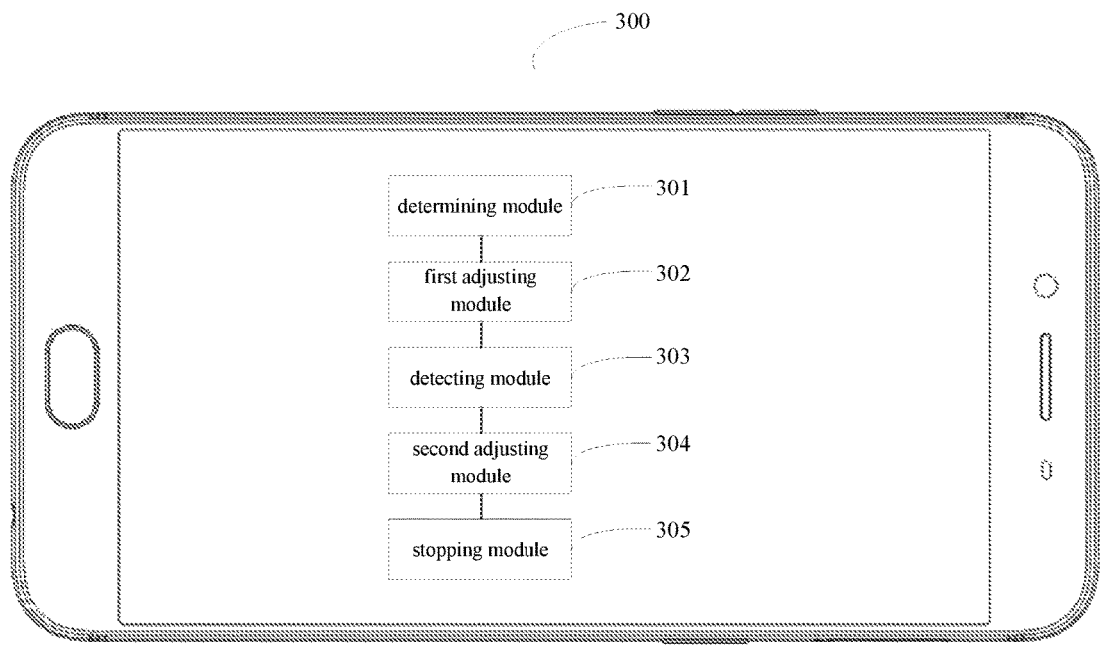
FIG. 9 is a schematic diagram of a terminal according to an embodiment of the present disclosure.

As illustrated in FIG. 9, the terminal 300 may include a determining module 301, a first adjusting module 302, a detecting module 303, a second adjusting module 304 and a stopping module 305.

The determining module 301 is configured to determine whether a present charging stage is a constant voltage charging stage.

The first adjusting module 302 is configured to increase a predetermined charging cut-off voltage to a first charging cut-off voltage if it is determined by the determining module 301 that the present charging stage is the constant voltage charging stage.

The detecting module 303 is configured to periodically detect a charging current and a battery voltage at a predetermined time interval.

The second adjusting module 304 is configured to decrease the first charging cut-off voltage by a predetermined voltage adjustment magnitude when the charging current is greater than or equal to a predetermined threshold and the battery voltage is greater than or equal to a safety voltage.

The stopping module 305 is configured to stop charging when the charging current is less than the predetermined threshold.

In embodiments of the present disclosure, the second adjusting module 304 includes a first obtaining sub-module, a second obtaining sub-module and an adjusting sub-module.

The first obtaining sub-module is configured to obtain a first difference value between the battery voltage and the safety voltage when the charging current is greater than or equal to the predetermined threshold and the battery voltage is greater than or equal to the safety voltage.

The second obtaining sub-module is configured to obtain the predetermined voltage adjustment magnitude according to the first difference value.

The adjusting sub-module is configured to decrease the first charging cut-off voltage by the predetermined voltage adjustment magnitude.

In embodiments of the present disclosure, the second obtaining sub-module is configured to determine a difference interval which the first difference value is in, and to obtain the predetermined voltage adjustment magnitude according to the difference interval and a predetermined mapping relationship, the predetermined mapping relationship being a mapping relationship between the difference interval and the predetermined voltage adjustment magnitude.

In embodiments of the present disclosure, the determining module 301 includes a third obtaining sub-module and a determining sub-module.

The third obtaining sub-module is configured to obtain a present battery voltage.

The determining sub-module is configured to determine whether the present charging stage is the constant voltage charging stage according to the present battery voltage.

In embodiments of the present disclosure, the determining sub-module is configured to obtain a second difference value between the predetermined charging cut-off voltage and the present battery voltage, to determine whether the second difference value is less than a predetermined difference value, and to determine that the present charging stage is the constant voltage charging stage if the second difference value is less than the predetermined difference value.

Figure 10:
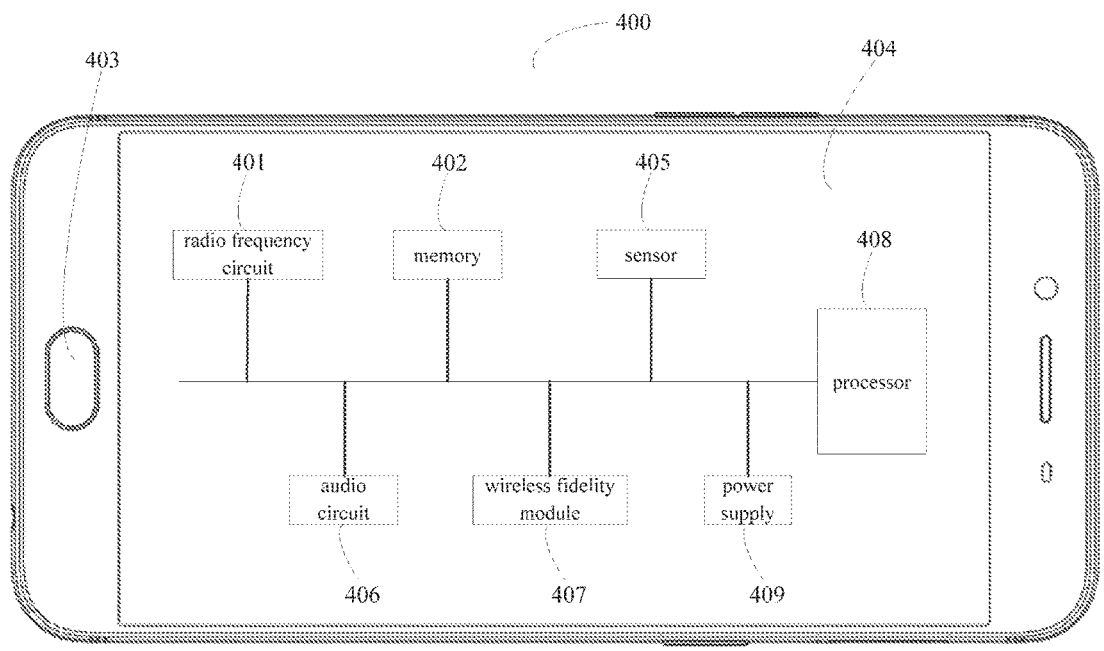
FIG. 10 is a schematic diagram of a terminal according to another embodiment of the present disclosure.

In embodiments of the present disclosure, another terminal is provided. As illustrated in FIG. 10, the terminal 400 may include a radio frequency (RF) circuit 401, a memory 402 including one or more computer-readable storage medium, an input unit 403, a display unit 404, a sensor 405, an audio circuit 406, a wireless fidelity (WiFi) module 407, a processor 408 including one or more processing cores, and a power supply 409. It will be understood by those skilled in the art that the terminal structure illustrated in FIG. 10 does not constitute a limitation to the terminal. Compared to the drawing illustrated, more or fewer components may be included, and a combination of some components or different component arrangements may also be possible.

The RF circuit 401 may be configured to communicate with a network device or other electronic devices through wireless communication, so as to perform information transmission with the network device or other electronic devices.

The memory 402 may be configured to store application programs and data. The application program stored in the memory 402 contains executable program codes. The application program may constitute various functional modules. The processor 408 may execute various functional applications and data processing by running the application programs stored in the memory 402.

The input unit 403 may be configured to receive input numeric information, character information or user characteristic information (such as a fingerprint), and to generate keyboard, mouse, joystick, optical or trackball signal input related to user settings and function control. The input unit 403 may include a fingerprint identification module.

The display unit 404 may be configured to display information input by the user or information provided to the user and various graphical user interfaces of the terminal, in which these graphical user interfaces may be constructed from graphics, text, icons, video, and any combination thereof.

The terminal may also include at least one sensor 405, such as a light sensor, a motion sensor, and other sensors.

The audio circuit 406 may provide an audio interface between the user and the terminal through a speaker or a microphone.

Wireless Fidelity (WiFi) belongs to a short distance wireless transmission technology. A terminal may communicate with other terminals or servers through the WiFi module 407.

The processor 408 is a control center of the terminal, and respective components in the terminal may be coupled to the processor 408 via various interfaces and lines. The processor 408 may perform various functions of the terminal and process data by running or executing the application programs stored in the memory 402 and calling the data stored in the memory 402, thus performing the whole monitoring on the terminal.

The terminal also includes a power supply 409 (such as a battery) that supplies power to respective components. In some embodiments of the present disclosure, the power supply may be logically coupled to the processor 408 through a power management system, such that functions such as charging management, discharging management and power consumption management may be realized through the power management system.

In embodiments of the present disclosure, although not illustrated in FIG. 10, the terminal may also include a camera or a Bluetooth module, which will not be elaborated here.

In an embodiment of the present disclosure, the processor 408 in the terminal may load the executable program codes corresponding to processes of one or more application programs into the memory 402 according to the following instructions, and the processor 408 may execute the application programs stored in the memory 402 to realize various functions:

determining whether a present charging stage is a constant voltage charging stage;

increasing a predetermined charging cut-off voltage to a first charging cut-off voltage if the present charging stage is the constant voltage charging stage;

periodically detecting a charging current and a battery voltage at a predetermined time interval;

decreasing the first charging cut-off voltage by a predetermined voltage adjustment magnitude when the charging current is greater than or equal to a predetermined threshold and the battery voltage is greater than or equal to a safety voltage; and stopping charging when the charging current is less than the predetermined threshold.

In some embodiments of the present disclosure, in the case that the first charging cut-off voltage is decreased by the predetermined voltage adjustment magnitude when the charging current is greater than or equal to the predetermined threshold and the battery voltage is greater than or equal to the safety voltage, the processor 408 is configured to: obtain a first difference value between the battery voltage and the safety voltage when the charging current is greater than or equal to the predetermined threshold and the battery voltage is greater than or equal to the safety voltage; obtain the predetermined voltage adjustment magnitude according to the first difference value; and decrease the first charging cut-off voltage by the predetermined voltage adjustment magnitude.

In some embodiments of the present disclosure, in the case that the predetermined voltage adjustment magnitude is obtained according to the first difference value, the processor 408 is configured to: determine a difference interval which the first difference value is in; and obtain the predetermined voltage adjustment magnitude according to the difference interval and a predetermined mapping relationship, the predetermined mapping relationship being a mapping relationship between the difference interval and the predetermined voltage adjustment magnitude.

In some embodiments of the present disclosure, in the case that it is determined whether the present charging stage is the constant voltage charging stage, the processor 408 is configured to: obtain a present battery voltage; and determine whether the present charging stage is the constant voltage charging stage according to the present battery voltage.

In some embodiments of the present disclosure, in the case that it is determined whether the present charging stage is the constant voltage charging stage according to the present battery voltage, the processor 408 is configured to: obtain a second difference value between the predetermined charging cut-off voltage and the present battery voltage; determine whether the second difference value is less than a predetermined difference value; and determine that the present charging stage is the constant voltage charging stage if the second difference value is less than the predetermined difference value.

In the above embodiments, the description of respective embodiments may be focused on different contents, and unspecified components or processes may refer to the detailed description of the charging control method, which are not elaborated here.

As described above, according to the terminal of embodiments of the present disclosure, it is determined whether the present charging stage is the constant voltage charging stage. The predetermined charging cut-off voltage is increased to the first charging cut-off voltage if the current charging stage is the constant voltage charging stage. The charging current and the battery voltage are periodically detected at a predetermined time interval. The first charging cut-off voltage is decreased by the predetermined voltage adjustment magnitude when the charging current is greater than or equal to the predetermined threshold and the battery voltage is greater than or equal to the safety voltage. The charging is completed when the charging current is less than the predetermined threshold. In other words, in the constant voltage charging stage, the charging cut-off voltage is increased first, and the charging current is increased with the increasing of the charging cut-off voltage. When the battery voltage is greater than or equal to the state voltage, the charging cut-off voltage is decreased. The charging process is completed when the charging current is less than the predetermined threshold. Therefore, the battery may be fully charged more quickly, and the charging time may be shortened.

It should be understood that one skilled in the art will appreciate that all or a portion of steps in various methods of the embodiments described above may be realized by instructing related hardware via programs, which may be stored in the computer readable storage medium. The above-mentioned storage medium may include a read-only memory (ROM), a random-access memory (RAM), a magnetic tape, a floppy disk, and the like.

Detailed description of the charging control method, the charging control device and the terminal provided in the embodiments of the present disclosure is made as above. Although explanatory embodiments have been illustrated and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A charging control method for a terminal comprising a battery and a processor, comprising:

determining, by the processor, whether a present charging stage of the battery is a constant voltage charging stage;

increasing, by the processor, a predetermined charging cut-off voltage to a first charging cut-off voltage if the present charging stage is the constant voltage charging stage;

periodically, by the processor, detecting a charging current and a battery voltage of the battery at a predetermined time interval;

decreasing, by the processor, the first charging cut-off voltage by a predetermined voltage adjustment magnitude when the charging current is greater than or equal to a predetermined threshold and the battery voltage is greater than or equal to a safety voltage; and stopping, by the processor, charging of the battery when the charging current is less than the predetermined threshold.

2. The method of claim 1, wherein decreasing, by the processor the first charging cut-off voltage by the predetermined voltage adjustment magnitude when the charging current is greater than or equal to the predetermined threshold and the battery voltage is greater than or equal to the safety voltage comprises:

obtaining, by the processor, a first difference value between the battery voltage and the safety voltage when the charging current is greater than or equal to the predetermined threshold and the battery voltage is greater than or equal to the safety voltage;

obtaining, by the processor, the predetermined voltage adjustment magnitude according to the first difference value;

decreasing, by the processor, the first charging cut-off voltage by the predetermined voltage adjustment magnitude.

3. The method of claim 2, wherein obtaining, by the processor the predetermined voltage adjustment magnitude according to the first difference value comprises:

determining, by the processor, a difference interval where the first difference value is located;

obtaining, by the processor, the predetermined voltage adjustment magnitude according to the difference interval and a predetermined mapping relationship, the predetermined mapping relationship being a mapping relationship between the difference interval and the predetermined voltage adjustment magnitude.

4. The method of claim 1, wherein determining, by the processor whether the present charging stage of the battery is the constant voltage charging stage comprises:

obtaining, by the processor, a present battery voltage of the battery;

determining, by the processor, whether the present charging stage is the constant voltage charging stage according to the present battery voltage.

5. The method of claim 4, wherein determining, by the processor whether the present charging stage is the constant voltage charging stage according to the present battery voltage comprises:

obtaining, by the processor, a second difference value between the predetermined charging cut-off voltage and the present battery voltage;

determining, by the processor, whether the second difference value is less than a predetermined difference value;

determining, by the processor, that the present charging stage is the constant voltage charging stage if the second difference value is less than the predetermined difference value.

6. The method of claim 1, wherein the predetermined charging cut-off voltage is 4.35V, and the first charging cut-off voltage is 4.45V.

7. The method of claim 1, wherein the predetermined voltage adjustment magnitude is 20 mV.

8. A charging control device, comprising:
a non-transitory computer-readable medium comprising computer-executable instructions stored thereon; and
an instruction execution system configured to execute the instructions to implement:
a determining module, configured to determine whether a present charging stage is a constant voltage charging stage;
a first adjusting module, configured to increase a predetermined charging cut-off voltage to a first charging cut-off voltage if the present charging stage is the constant voltage charging stage;
a detecting module, configured to periodically detect a charging current and a battery voltage at a predetermined time interval;
a second adjusting module, configured to decrease the first charging cut-off voltage by a predetermined voltage adjustment magnitude when the charging current is greater than or equal to a predetermined threshold and the battery voltage is greater than or equal to a safety voltage; and a stopping module, configured to stop charging when the charging current is less than the predetermined threshold.

9. The device of claim 8, wherein the second adjusting module comprises:

a first obtaining sub-module, configured to obtain a first difference value between the battery voltage and the safety voltage when the charging current is greater than or equal to the predetermined threshold and the battery voltage is greater than or equal to the safety voltage;

a second obtaining sub-module, configured to obtain the predetermined voltage adjustment magnitude according to the first difference value;

an adjusting sub-module, configured to decrease the first charging cut-off voltage by the predetermined voltage adjustment magnitude.

10. The device of claim 9, wherein the second obtaining sub-module is configured to:

determine a difference interval where the first difference value is located; and obtain the predetermined voltage adjustment magnitude according to the difference interval and a predetermined mapping relationship, the predetermined mapping relationship being a mapping relationship between the difference interval and the predetermined voltage adjustment magnitude.

11. The device of claim 8, wherein the determining module comprises:

a third obtaining sub-module, configured to obtain a present battery voltage;

a determining sub-module, configured to determine whether the present charging stage is the constant voltage charging stage according to the present battery voltage.

12. The device of claim 11, wherein the determining sub-module is configured to:

obtain a second difference value between the predetermined charging cut-off voltage and the present battery voltage;

determine whether the second difference value is less than a predetermined difference value;

determine that the present charging stage is the constant voltage charging stage if the second difference value is less than the predetermined difference value.

13. The device of claim 8, wherein the predetermined charging cut-off voltage is 4.35V, and the first charging cut-off voltage is 4.45V.

14. The device of claim 8, wherein the predetermined voltage adjustment magnitude is 20 mV.

15. A terminal, comprising:
a battery, configured to power respective components in the terminal;
a memory, stored with executable program codes; and
a processor, coupled to the memory, and configured to perform a charging control method by executing the executable program codes in the memory, the charging control method comprising:
determining whether a present charging stage is a constant voltage charging stage;
increasing a predetermined charging cut-off voltage to a first charging cut-off voltage if the present charging stage is the constant voltage charging stage;
periodically detecting a charging current and a battery voltage at a predetermined time interval;
decreasing the first charging cut-off voltage by a predetermined voltage adjustment magnitude when the charging current is greater than or equal to a predetermined threshold and the battery voltage is greater than or equal to a safety voltage; and stopping charging when the charging current is less than the predetermined threshold.

16. The terminal according to claim 15, wherein the processor is configured to:

obtain a first difference value between the battery voltage and the safety voltage when the charging current is greater than or equal to the predetermined threshold and the battery voltage is greater than or equal to the safety voltage;

obtain the predetermined voltage adjustment magnitude according to the first difference value;

decrease the first charging cut-off voltage by the predetermined voltage adjustment magnitude.

17. The terminal of claim 16, wherein the processor is configured to:

determine a difference interval where the first difference value is located;

obtain the predetermined voltage adjustment magnitude according to the difference interval and a predetermined mapping relationship, the predetermined mapping relationship being a mapping relationship between the difference interval and the predetermined voltage adjustment magnitude.

18. The terminal of claim 15, wherein the processor is configured to:

obtain a present battery voltage;

determine whether the present charging stage is the constant voltage charging stage according to the present battery voltage.

19. The terminal of claim 18, wherein the processor is configured to:

obtain a second difference value between the predetermined charging cut-off voltage and the present battery voltage;

determine whether the second difference value is less than a predetermined difference value;

determine that the present charging stage is the constant voltage charging stage if the second difference value is less than the predetermined difference value.

20. The terminal of claim 15, wherein the predetermined charging cut-off voltage is 4.35V, and the first charging cut-off voltage is 4.45V.

* * * * *